(12) United States Patent
Brennan et al.

(10) Patent No.: US 6,871,225 B1
(45) Date of Patent: Mar. 22, 2005

(54) SYNTHETIC CORN HYBRID P67

(75) Inventors: Steven J. Brennan, Farmington, CT (US); Geoff Butland, Farmington, CT (US); Krishnaiah Dayyala, Andhrapradesh (IN); Sreekanth Reddy Katta, AndraPradesh (IN); Radoslaw Narel, New Britain, CT (US); Radhakrishna Yechuri, Andhrapradesh (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/550,432

(22) Filed: Jul. 8, 1999

(51) Int. Cl.[7] .................... G06F 15/16; G06F 15/173; G06F 1/26; G06F 1/28; G06F 1/30; G05D 11/00; G05D 17/00; G05D 3/12; G05D 5/00

(52) U.S. Cl. .................... 709/224; 709/203; 709/219; 709/223; 700/286; 700/292; 700/294; 700/297; 713/340

(58) Field of Search .................... 709/219, 203, 709/223, 224; 700/286, 291–298; 713/340

(56) References Cited

U.S. PATENT DOCUMENTS

| | | | | |
|---|---|---|---|---|
| 4,218,737 A | * | 8/1980 | Buscher et al. ............... | 702/62 |
| 5,381,462 A | * | 1/1995 | Larson et al. .......... | 379/106.06 |
| 5,557,545 A | * | 9/1996 | Loffel et al. ............... | 700/286 |
| 5,611,059 A | * | 3/1997 | Benton et al. ............... | 345/734 |
| 5,696,695 A | * | 12/1997 | Ehlers et al. ............... | 700/286 |
| 5,706,207 A | * | 1/1998 | Kurten et al. ............... | 700/286 |
| 5,768,148 A | * | 6/1998 | Murphy et al. ............. | 700/286 |
| 5,796,631 A | * | 8/1998 | Iancu et al. .................. | 713/340 |
| 5,862,391 A | | 1/1999 | Salas et al. ............ | 395/750.01 |
| 5,903,476 A | * | 5/1999 | Mauskar et al. ............... | 716/1 |
| 5,945,993 A | * | 8/1999 | Fleischmann ............... | 345/771 |
| 6,067,505 A | * | 5/2000 | Bonoyer et al. ............... | 702/85 |
| 6,145,014 A | * | 11/2000 | Chong ........................ | 719/328 |
| 6,169,979 B1 | * | 1/2001 | Johnson ...................... | 705/412 |
| 6,219,623 B1 | * | 4/2001 | Wills ........................... | 702/60 |
| 6,259,972 B1 | * | 7/2001 | Sumic et al. ............... | 700/286 |
| 6,301,527 B1 | * | 10/2001 | Butland et al. ............. | 700/286 |
| 6,360,177 B1 | * | 3/2002 | Curt et al. ..................... | 702/64 |
| 6,360,178 B1 | * | 3/2002 | Parsons et al. ............... | 702/65 |

(List continued on next page.)

OTHER PUBLICATIONS

Anderson, Bo. "Power Management Control Systems—More Than Energy Savings" GE Electrical Distribution and Control, IEEE–IAS 1997, Pp. 97–112.*

(List continued on next page.)

*Primary Examiner*—Rupal Dharia
*Assistant Examiner*—Melvin H. Pollack
(74) *Attorney, Agent, or Firm*—Cantor Colburn LLP

(57) ABSTRACT

A revision to a Power Management Control System includes an improved waveform client/waveform server communication interface based on a first inter-process communication protocol, preferably DCOM. The first inter-process communication protocol preferably resides in the waveform application alongside an existing second inter-process communication protocol, i.e. DDE, for backwards compatibility. The improvement allows the application to operate across network segments in a more robust, reliable manner than through the first inter-process communication protocol, thus enabling the waveform server to operate effectively as an NT service and providing independent third party client software access to the waveform server waveform capture functions. The waveform application system comprises interfaces within the waveform server which are implemented by the waveform client, and sink interfaces within the waveform client which are designated for each device class and to which the waveform server fires data as changes occur in the waveform data of the preselected electronic device. A method for communicating between the waveform server and waveform client is also described.

19 Claims, 2 Drawing Sheets

U.S. PATENT DOCUMENTS

| | | | |
|---|---|---|---|
| 6,377,283 B1 * | 4/2002 | Thomas | 345/762 |
| 6,380,949 B2 * | 4/2002 | Thomas et al. | 345/705 |
| 6,393,341 B1 * | 5/2002 | Lawrence et al. | 700/286 |
| 6,396,839 B1 * | 5/2002 | Ardalan et al. | 370/401 |
| 6,477,434 B1 * | 11/2002 | Wewalaarachchi et al. | 700/83 |
| 6,496,757 B1 * | 12/2002 | Flueck et al. | 700/292 |
| 6,549,880 B1 * | 4/2003 | Willoughby et al. | 703/13 |
| 6,643,566 B1 * | 11/2003 | Lehr et al. | 700/286 |

OTHER PUBLICATIONS

Zhu, Jun and Lubkeman, David L. "Object–Oriented Development of Software Systems for Power System Simulations" IEEE Transactions on Power Systems, vol. 12, Issue 2, May 1997, Pp. 1002–1007.*

Leibfried, T. "Online Monitoring of Power Transformers—System Technology and Data Evaluation" Eleventh International Symposium on High Voltage Engineering, vol. 5, 1999, Pp. 184–187.*

Leibfried, T. "Monitoring of Power Transformers using the Transfer Function Method" IEEE Transactions on Power Delivery, vol. 14, No. 4, Oct. 1999.*

Bartos, Frank J. "Power Management Helps Your Plant 'Live Long and Prosper'" Control Engineering, Dec. 1, 1998.*

GE Power Management—PMCS brochure.*

POWERLOGIC brochure.*

Young, Vickie; Wonderware's Communication Concept (OPC, Suitelink, and DDE);Wondderware Corp.; Dec. 3, 1998; pp. 1–8.

Lewarne, Steve; ActiveX Components and The FactorySuite; Wonderware Corp.; Oct. 1997; pp. 1–15.

Brochure entitled "Wonderware FactorySuite 2000"; Wonderware Corporation; 1997; p. 1, 3, 5, 7, 9, 11, 13, 15, 17, 19, 21, 23, 25, 27, 29, 31, 33, 35, 37, 39, 41, 43, 45, 47.

* cited by examiner

SYNTHETIC CORN HYBRID P67

BACKGROUND OF THE INVENTION

The present invention relates to a power management control system (PMCS), and more particularly relates to an improved client/server communication interface for a PMCS.

PMCS's allow an operator to monitor and control a variety of intelligent electronic devices within an electrical distribution system. Such devices can include relays, meters, switches, etc., which may be mounted within a common switchgear cabinet to create a control panel. One such PMCS is described in U.S. Pat. No. 5,862,391 entitled "Power Management Control System."

One PMCS tool, such as General Electric's Waveform Capture, a POWER LEADER™ PMCS tool, for examining current and voltage waveforms and the associated harmonic data of selected devices within the system, helps to increase productivity, reduce downtime, and improve power quality. By selecting voltage and current waveforms, an operator can use such a waveform capture tool to examine selected devices in the system. The waveform capture tool uses the PMCS power management network to retrieve captured and recorded waveform data from power management devices.

General Electric's Waveform Capture application is a Windows NT™-based package that currently communicates with the PMCS Dynamic Data Exchange (DDE) server. The PMCS DDE server is a Microsoft® Windows NT™ application that allows other Windows NT™ applications (clients) to access data from General Electric Co. and other third-party devices.

The waveform capture software consists of two components, the Waveform Server ("WFS") and the Waveform Client ("WFC"). A request for a waveform for a particular device is entered at the WFC. The WFC passes this request to the WFS (for most PMCS devices) or to the GE 7700 Gateway Server (for the EPM 7700). The WFS in turn passes the request to the PMCS DDE Server, which issues the command to the device, collects the necessary data and passes the data back to the WFS. The GE 7700 Gateway Server collects its data from the PML Pegasys Comm Server. Once the Gateway or WFS receives the data in response to its request, it collates the data into a file for viewing at the WFC.

Customers who use the existing WFC/WFS DDE communications interface are limited by industry standards to employing the NetBEUI protocol as the basis for DDE communications. NetBEUI is the protocol stack that comes with IBM® and Microsoft® LAN products. NetBEUI, however, lacks a network layer and is weak in the area of security. NetBEUI is a component of Microsoft® Windows NT™ operating system and it limits communication between distributed software applications to single network segments. As a result, distributed WFC and WFS applications are limited to operation on a single network segment. Customers with extensive network installations with multiple segments (routers) cannot operate the existing WFC/WFS applications on their topology. In addition, customers who desired to have their PMCS operate as NT Services (for increased security and automatic startup) could not be given this capability because of the limitations of the current DDE communication scheme.

Other vendors who use DDE in their applications have incorporated enhancements to the DDE protocol within their applications in order to circumvent the indicated limitations of NetBEUI. For example, Wonderware's InTouch Suite Link is an alternative based on TCP/IP and supports the server-topic-item model of DDE, thus maintaining the appearance of a DDE interface.

SUMMARY OF THE INVENTION

In an exemplary embodiment of the invention, a waveform applications system for providing current and voltage waveform information of selected electronic devices monitored by a power management control system is disclosed. The waveform applications system includes a waveform client communicating with a waveform server using an inter-process communication protocol. The waveform applications system further includes first and second interfaces within the waveform server and a plurality of functions within each interface. A connection point interface within the waveform client includes a plurality of sink interfaces forming the connection point interface, each sink interface representing a device class. The first and second interfaces are accessed by the waveform client. Selection of a device by the waveform client initiates the waveform server to fire data relating to the selected device to an associated sink interface.

In a preferred embodiment of the present invention, the inter-process communication protocol is DCOM which resides alongside an existing inter-process communication protocol, DDE, for backwards compatibility.

DETAILED DESCRIPTION OF THE PREFERRED EMBODIMENTS

The Communications Interface 20 of the present invention solves the PMCS 10 inter-process communication problem inherent in the existing DDE interface 22. The PMCS 10's open access is preferably enhanced with an additional inter-process communication protocol 20 such as the object request broker, or object bus, Distributed Component Object Model (DCOM) interface from Microsoft. Using DCOM, third party waveform capture client applications will be able to communicate to the WFS 16 to perform waveform capture processes and PMCS 10 waveform capture functionality will be installable on a wider range of more sophisticated customer network installations.

Figure 1:
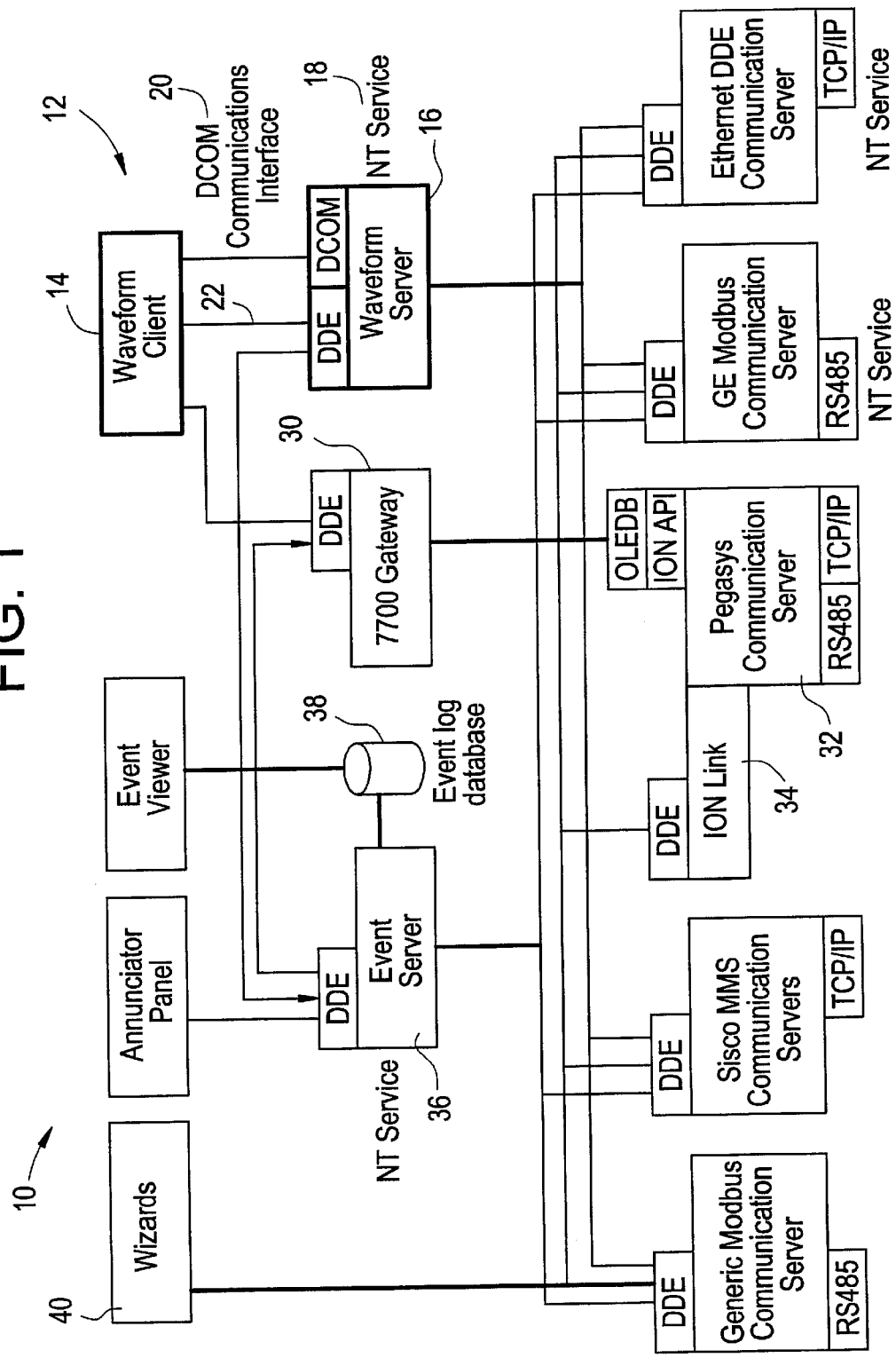
FIG. 1 shows a block diagram of the system architecture for a Power Management Control System; and, FIG. 2 shows a block diagram of the interfaces within a waveform server and waveform client and the data flow between these interfaces.

The PMCS 10 product architecture is shown in FIG. 1. Waveform Capture software or application system 12 comprises two components: the Waveform Server 16 ("WFS 16") and the Waveform Client ("WFC 14") 14. A request for a waveform of a particular device is entered at the WFC 14. The WFC 14 passes this request to the WFS 16, for most PMCS 10 devices (not shown), or to the GE 7700 Gateway Server 30 for the EPM 7700. (Because the EPM 7700 meter is not compatible with the standard PMCS DDE server, the 7700 Gateway Server must be installed, along with a pair of "helper" applications, the Communications Server 32 and the Ion_Link Server 34. The Communications Server 32 processes all communications between the Gateway Server 30 and/or the Ion_Link 34 and the Ethernet-based EPM 7700 meters.) The WFS 16 in turn passes the request to the PMCS DDE server 36 (which comes in versions optimized for Ethernet TCP/IP or RS485 Modbus RTU networks) which issues the command to the device, collects the necessary data, and passes the data back to the WFS 16. The GE7700 Gateway Server 30 collects its data from the PML Pegasys Comm server 32. Once the Gateway 30 or WFS 16 receives the data in response to its request, it collates the data into a file for viewing at the WFC 14.

The Event Logger 38 is a PMCS application that efficiently analyzes, sorts, and logs unusual system behavior such as circuit breaker trips, undervoltages, and overcurrents. Extensive data logging capabilities make it a useful tool for analyzing and predicting system maintenance patterns. Wizards 40 are utilities within the system 10 that guide the configuration of certain intelligent electronic devices.

The area of design revision (Communication Interface) 20 affects the software components of the WFC 14 and WFS 16. The WFC 14 and WFS 16 application revisions are preferably created using the C/C++ programming language, however, since DCOM interface 20 is language-independent, the use of other programming languages are within the scope of this invention. A DCOM interface is a collection of methods which serves as a client/server contract which defines functions independently from their implementation. The interfaces of the present invention between the two applications are described below, and as shown in FIG. 2.

Figure 2:
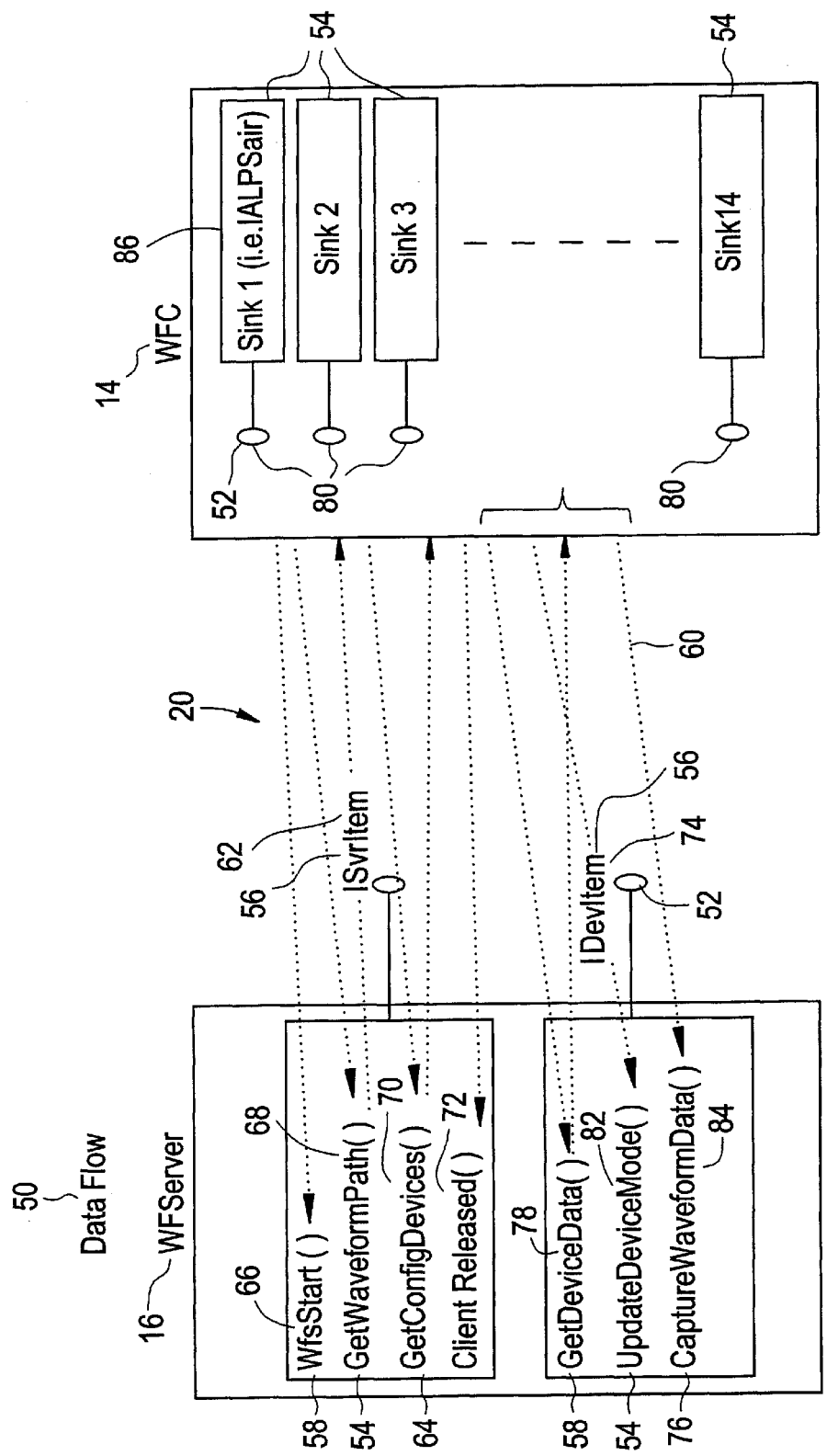

FIG. 2 shows the data flow 50 over the DCOM interface 20 between the WFS 16 and the WFC 14. An interface in DCOM is represented by a "plug-in jack" 52 extending from an object 54 to form "bullet-and-stick" diagrams as shown. Each plug-in jack 52 represents an interface 56, that is, a group of related functions, methods, or processes. The server objects 58 are accessed through interface pointers 60 from the client applications. In the present invention, preferably two DCOM interfaces 56 exist on the WFS 16. These interfaces 56 are accessed by the WFC 14 application. The data flow between the WFS 16 and the WFC 14 over the DDE connection, on the contrary, are based on DDE commands, such as POKE, ADVISE, UNADVISE.

A first interface 62, "IsvrItem" (a DCOM interface 56 is conventionally given a name starting with a capital "I") provides WFC 14 access to several functions (methods), collectively shown at 64, that are used to obtain WFS 16 information critical to the waveform capture operation.

One method 66 (e.g. "HRESULT WFS 16Start( )") within the first interface 62 will permit the WFC 14 to set WFS 16 into Start mode in case the WFS 16 is in Stop mode.

Another method 68 (e.g. "HRESULT GetWaveformPath ([out,retval] BSTR* path)") returns the information regarding the directory path where the captured waveforms get stored on the system through out a parameter such as 'path'. That is, the WFC 14 requests the waveform path and then the WFS 16 sends the waveform path to the WFC 14.

Another method 70 (e.g. "HRESULT GetConfigDevices ([out,retval] BSTR* dev)") returns the information regarding all the devices that are configured at the WFS 16 throughout a parameter such as 'dev'. That is, the WFC 14 requests the list of configured devices. Then, the WFS 16 sends the lists of configured devices to WFC 14.

Another method 72 (e.g. "HRESULT ClientReleasedo( )") can be invoked to decrement the count of WFC 14's connected to WFS 16. That is, when the WFC 14 gets into STOP mode, it informs WFS 16 to release the link.

A second interface 74, "IdevItem" in the WFS 16 provides WFC 14 access to several functions (methods), shown collectively at 76, that are used to relay information related to the waveform capture operation and to initiate and monitor the waveform capture process.

One method 78 (e.g. "HRESULT GetDeviceData([in] BSTR Topic, [in] BSTR Item)" where "Topic" is the input parameter which gives the device name and "Item" is the input parameter which gives the Item name) in the second interface 74 may be invoked by the WFC 14 to prompt the WFS 16 to provide data regarding the supported devices (Items: Device_Status, Command_Status, Data File, Wf_Server_Status, Device_Mode, Trace_Count, Channel_Number). On Invoke of this method 78 WFS 16 will fire back the information regarding the specified Item on specified Topic. That is, the WFC 14 asks for data for a selected device. Once a device is selected, the Sink Interface use begins, where the sink interfaces are shown collectively at 80. The WFS 16 sends the data to the WFC 14, and keeps firing the data whenever a change occurs in the device data.

Another method 82 (e.g. "HRESULT UpdateDeviceMode ([in] BSTR Topic, [in]BSTR Data)" where "Topic" is the input parameter which gives the Device name and "Data" is the Device Mode value) allows the WFC 14 to set a waveform capture mode for a given device. In other words, this method 82 will set the DEVICE_MODE value received through the Input parameter 'Data' as default for the specified device. The WFC 14 invokes this method 82 whenever the user changes the waveform capture mode at the user interface. That is, the WFC 14 selects a device mode and sends it to the WFS 16 to set that mode as a default.

Another method 84 (e.g. "HRESULT CaptureWaveformData([in] BSTR Topic, [in] BSTR Data)" where "Topic" is the input parameter which gives the Device Name and "Data" is the input parameter which gives the trigger/upload information to the WFS 16) is used to request that waveform data be captured (Upload/Trigger). This method 84 retrieves waveform information on the request Upload/Trigger from WFC 14. On this request, WFS 16 starts capturing waveform data. The server 16 updates the client 14 whenever there is a change in capture status. There is continuous updating until the upload or trigger ends.

The interface "IconnectionPointImpl" 80 is used as the medium by which the WFC 14 and WFS 16 will synchronize the setup, initiation, and completion of the waveform capture process. This Connection Point 80 is used as the means by which the WFS 16 will respond to WFC 14 requests and the means by which WFS 16 will supply unsolicited information to the WFC 14. The information references an Item and associated Data. This means of communication is called Event Firing.

This interface 80 is implemented for a device class. Each supported protection device is a separate device class. For example, a device class can be developed for an intelligent circuit breaker or power meter. Device objects, shown collectively at 86, exist only at run time to support this connection point 80.

As mentioned above, this interface 80 exists to support an Event Firing technique. With this technique, there are separate device objects 86 instantiated at the WFC 14 for each device. Whenever there is change in data on any Item for the connected devices, (i.e. whenever, the WFS 16 has data to send to the WFC 14 that is related to a currently selected device) the WFS 16 fires back that information to WFC 14 using a method of the appropriate device object 86.

A method (e.g. "ILPSsink:Iunknown {HRESULT LPSinfo([in] BSTR Item, [in] BSTR data);} exists for each supported protection device. Whenever there is change on any Item related to the active device, WFS 16 fires back that information WFC 14 using this method. Each class will preferably handle the Event firing through Connection Point implementation.

This interface 80 is preferably provided on the WFC 14 side for implementing the Connection Point between WFS 16 and the WFC 14. When data related to any item gets changed for a device, WFS 16 fires back that information to the appropriate method of each of the sink interfaces 80.

Again, device objects 86 exist only to support sink interfaces 80 for direct communication with WFS 16's connection point implementation. A separate interface exists for each supported device class. This interface is accessed by the WFS 16 when it fires back device specific information related to the waveform capture process. All communication occurs via sink interface 80 (connection point).

In summary, WFS 16 preferably has two incoming interfaces 62, 74 implemented and WFC 14 has a plurality (e.g. 14, although there could be more or less sink objects depending on the quantity of devices in the PMCS) of outgoing interfaces 80 or sink objects 86 implemented. Outgoing interfaces 80 can only be used for event firing. No object can invoke these interfaces 80 directly.

This revision to the Power Management Control System 10 (PMCS) software product will provide an improved WFC 14/WFS 16 Communication Interface 20. The improvement will allow the application 12 to operate across network segments in a more robust, reliable manner than the current implementation. The interface 20 is preferably based on the Microsoft Distributed Component Object Model technology (DCOM) and the TCP/IP networking protocol. The Communication Interface 20 will reside in the application 12 alongside the existing DDE Communication Interface (Dynamic Data Exchange) 22 for backwards compatibility. That is, by employing both types of interprocess communication protocols 20, 22, a WFC 14 whose system has not been updated can still utilize waveform data captured by the DDE interface 22, and legacy data from the DDE interface 22 can still be accessed by a WFC 14 whose system is capable of communicating over the DCOM interface 20. The 'open' DCOM interface 20 will provide independent third party client software access to the WFS 16 waveform capture functions. The Communication Interface 20 will permit the WFS 16 to operate effectively as an NT Service which has not been possible with the existing DDE communication scheme 22. Furthermore, unlike the prior art, the present invention is not restricted to maintaining an interface which "looks like" DDE, and thus the present invention offers a quicker time-to-market approach.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A waveform applications system for providing current voltage waveform information of selected electronic devices monitored by a power management control system, the waveform applications system employing a first inter-process communication protocol and a second inter-process communication protocol, the waveform applications system comprising a waveform client and a waveform server, the waveform client communicating with the waveform server using either the first or the second inter-process communication protocol, wherein the first inter-process communication protocol is DCOM and the second inter-process communication protocol is DDB.

2. A waveform applications system for providing current and voltage waveform information of selected electronic devices monitored by a power management control system, the waveform applications system having a waveform client communicating with a waveform server using an inter-process communication protocol, the waveform applications system comprising:

a waveform server;

first and second interfaces within the waveform server, a plurality of functions with each interface;

a waveform client; and a connection point interface within the waveform client, a plurality of sink interfaces forming the connection point interface, each sink interface representing a device class;

wherein the first and second interfaces are accessed by the waveform client and wherein selection of a device by the waveform client initiates the waveform server to fire data relating to the selected device to an associated sink interface; and wherein the inter-process communication protocol is a first inter-process communication protocol, the waveform application system further comprising a second inter-process communication protocol through which the waveform client may communicate with the waveform server, and wherein the first inter-process communication protocol is DCOM, and wherein the second inter-process communication protocol is DDE.

3. The waveform application system of claim 1 wherein the first interface provides the waveform client access to several functions that are used to obtain waveform server information.

4. The waveform application system of claim 2 wherein the first interface comprises a first function for setting the waveform server in start mode.

5. The waveform application system of claim 3 wherein the first interface comprises a second function for receiving a request from the waveform client and returning information to the waveform client regarding a directory path where captured waveforms are stored.

6. The waveform application system of claim 4 wherein the first interface comprises a third function for receiving a request from the waveform client and returning information to the waveform client regarding all devices that are configured at the waveform server.

7. The waveform application system of claim 5 wherein the first interface comprises a fourth function that informs the waveform server when a particular waveform client is in stop mode.

8. The waveform application system of claim 2 wherein the second interface provides the waveform client access to several functions that are used to relay information related to waveform capture operations and to initiate and monitor waveform capture processes.

9. The waveform application system of claim 7 wherein the second interface comprises a first function for receiving a request from the waveform client and returning information to the waveform client regarding a selected device.

10. The waveform application system of claim 8 wherein the second interface comprises a second function for receiving a selected device mode from the waveform client and setting it as a default.

11. The waveform application system of claim 9 wherein the second interface comprises a third function for receiving a request from the waveform client to capture waveform data.

12. a method of communicating between a waveform client and a waveform server comprising:

providing first and second interfaces within the waveform server;

defining a plurality of functions within each of the first and second interfaces;

providing a connection point interface within the waveform client;

defining a plurality of sink interfaces within the connection point interface, wherein each sink interface represents a device class;

addressing the first interface to obtain waveform server information;

addressing the second interface to obtain information related to waveform capture of a preselected electronic device; and, relaying information to a sink interface associated with the preselected electronic device, routing the communications between the waveform server and the waveform client over a DCOM interface, and routing the communications between the waveform server and the waveform client over a DDE interface.

13. The method of claim 11 wherein the step of addressing the first interface comprises setting the waveform server into start mode.

14. The method of claim 12 wherein the step of addressing the first interface further comprises requesting waveform path from the waveform server and delivering waveform path to the waveform client.

15. The method of claim 13 wherein the step of addressing the first interface further comprises requesting a list of configured devices from the waveform server and returning the list of configured devices to the waveform client.

16. The method of claim 14 wherein the step of addressing the first interface further comprises informing the waveform server when a waveform client is in stop mode and decrementing a count of waveform clients connected to the waveform server.

17. The method of claim 11 wherein the step of addressing the second interface comprises requesting data from the waveform server regarding a selected electronic device, returning the requested data to the waveform client, and continuing to fire data to the waveform client whenever a change occurs in the data.

18. The method of claim 16 wherein the step of addressing the second interface comprises selecting a device mode at the waveform client and setting it in the waveform server as a default.

19. The method of claim 17 wherein the step of addressing the second interface comprises requesting the waveform server to capture waveform data.

* * * * *

UNITED STATES PATENT AND TRADEMARK OFFICE
CERTIFICATE OF CORRECTION

PATENT NO. : 6,871,225 B1
DATED : March 22, 2005
INVENTOR(S) : Brennan et al.

It is certified that error appears in the above-identified patent and that said Letters Patent is hereby corrected as shown below:

Title page, Item [54] and Column 1, line 1,
Title, delete "SYNTHETIC CORN HYBRID P67" and insert therefor
-- CLIENT/SERVER COMMUNICATIONS INTERFACE --, Title page,
Item [22], Filed, delete "April 17, 2000" and insert therefor -- July 8, 1999 --.

Column 3,
Line 61, before "can" delete "ClientReleasedo( ) ")" and insert therefor
-- ClientReleased( ) " --.

Column 5,
Line 65, before "voltage," insert therefor -- and --.

Column 6,
Line 8, after "is" delete "DDB" and insert therefor -- DDE --.

Column 7,
Line 9, after "12." delete "a" and insert therefor -- A --.

Signed and Sealed this

Sixth Day of September, 2005

JON W. DUDAS
*Director of the United States Patent and Trademark Office*